(12) United States Patent
Song

(10) Patent No.: US 8,145,757 B2
(45) Date of Patent: Mar. 27, 2012

(54) METHOD FOR CHANGING SERVICE QUALITY OF A CONTENT ADAPTIVELY

(75) Inventor: Yu Kyoung Song, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 396 days.

(21) Appl. No.: 12/095,306

(22) PCT Filed: Nov. 30, 2006

(86) PCT No.: PCT/KR2006/005125
§ 371 (c)(1),
(2), (4) Date: Oct. 17, 2008

(87) PCT Pub. No.: WO2007/064158
PCT Pub. Date: Jun. 7, 2007

(65) Prior Publication Data
US 2009/0138596 A1 May 28, 2009

Related U.S. Application Data

(60) Provisional application No. 60/741,126, filed on Nov. 30, 2005.

(51) Int. Cl.
*G06F 15/173* (2006.01)
(52) U.S. Cl. ...................................................... 709/225
(58) Field of Classification Search ........... 709/223–229
See application file for complete search history.

(56) References Cited

U.S. PATENT DOCUMENTS

| | | | | |
|---|---|---|---|---|
| 6,266,328 | B1 * | 7/2001 | Johnson et al. | 370/260 |
| 6,480,474 | B2 * | 11/2002 | Johnson et al. | 370/260 |
| 6,529,907 | B1 | 3/2003 | Terakura et al. | |
| 6,577,595 | B1 * | 6/2003 | Counterman | 370/230 |
| 6,587,433 | B1 * | 7/2003 | Borella et al. | 370/230 |
| 6,661,779 | B2 * | 12/2003 | Johnson et al. | 370/260 |
| 6,947,378 | B2 * | 9/2005 | Wu et al. | 370/229 |
| 6,950,656 | B1 | 9/2005 | Bahk et al. | |
| 7,002,961 | B1 * | 2/2006 | Lane et al. | 370/395.1 |
| 7,155,215 | B1 * | 12/2006 | Miernik et al. | 455/423 |
| 7,184,418 | B1 * | 2/2007 | Baba et al. | 370/331 |
| 7,191,229 | B2 * | 3/2007 | Edmondson | 709/224 |
| 7,274,661 | B2 * | 9/2007 | Harrell et al. | 370/229 |
| 7,330,470 | B2 * | 2/2008 | Nakazawa et al. | 370/392 |
| 7,426,560 | B2 * | 9/2008 | Huff | 709/226 |
| 2002/0089973 | A1 * | 7/2002 | Manor | 370/352 |
| 2002/0097798 | A1 * | 7/2002 | Manor | 375/240.02 |
| 2003/0081595 | A1 * | 5/2003 | Nomura et al. | 370/353 |
| 2004/0022267 | A1 | 2/2004 | Birru | |
| 2004/0264462 | A1 * | 12/2004 | Bardalai et al. | 370/390 |
| 2005/0076136 | A1 | 4/2005 | Cho et al. | |
| 2006/0031749 | A1 | 2/2006 | Schramm et al. | |
| 2006/0077951 | A1 * | 4/2006 | Godas | 370/351 |

FOREIGN PATENT DOCUMENTS

WO 2004029829 4/2004

\* cited by examiner

*Primary Examiner* — Quang N. Nguyen
*Assistant Examiner* — Alicia Baturay
(74) *Attorney, Agent, or Firm* — Lee, Hong, Degerman, Kang & Waimey

(57) ABSTRACT

The present invention relates to a method for changing service quality of a content adaptively. When service quality updating action for a connection is received the present method invokes an action, used for requesting allowance of a new access to a network, to a device conducting traffic transfer services in order that service quality of the connection may be changed. The invoked action carries input arguments including traffic descriptor of the connection, carried by the service quality updating action, which a traffic handle for identifying the traffic descriptor uniquely has been allocated in.

2 Claims, 5 Drawing Sheets

*AdmitTrafficQos()*

| Argument | Direction | relatedStateVariable |
|---|---|---|
| AdmitTrafficDescriptor | In | A_ARG_TYPE_TrafficDescriptor |
| Resource | In | A_ARG_TYPE_Resource |
| AdmitTrafficQosResult | Out | A_ARG_TYPE_AdmitTrafficQosResult |

METHOD FOR CHANGING SERVICE QUALITY OF A CONTENT ADAPTIVELY

CROSS-REFERENCE TO RELATED APPLICATIONS

Pursuant to 35 U.S.C. §119, this application claims the benefit of earlier filing date and right of priority to International Application No. PCT/KR06/05125, filed on Nov. 30, 2006, and to U.S. Provisional Application No. 60/741,126, filed on Nov. 30, 2005.

1. TECHNICAL FIELD

The present invention relates to a technology for transferring content data through a home network, e.g., home network based on UPnP.

2. BACKGROUND ART

Recently, inexpensive and pervasive networking technologies based on various small devices are emerging or being commercialized. People can make good use of various home appliances such as refrigerators, TVs, washing machines, PCs, and audio equipments once such appliances are connected to a home network. For the purpose of such home networking, UPnP™ (hereinafter, it is referred to as UPnP for short) specifications have been proposed.

A UPnP network consists of a plurality of UPnP devices, services, and control points. A service on a UPnP network represents a smallest control unit on the network, which is modeled by state variables. A CP (Control Point) on a UPnP network represents a control application equipped with functions for detecting and controlling other devices and/or services. A CP can be operated on an arbitrary device which is a physical device such as a PDA providing a user with a convenient interface. A CP can also constitute a single device together with another service, e.g., a renderer service which expresses images by rendering media data. Therefore, multiple CPs can exist on a UPnP network and the user can control operations on a desired service by choosing a convenient CP depending on his/her current location or employed device.

Once a home network as above is built in a particular place such as a home, the user can conveniently make use of desired operations (e.g., operations of duplicating or transferring data between separate devices) irrespective of his/her current location; moreover, multiple users can share the same device at the same time, in the same place.

As described above, when multiple users use networked devices simultaneously or sequentially, or multiple tasks are carried out on networked devices simultaneously or sequentially, required quantity of data transmission may exceed transmission bandwidth provided by a network. In this case, network access for data transmission should be restricted.

For example, when additional network access is requested and bandwidth required by the request cannot be provided by a current network while multiple content data are being streamed through the network, either the request is rejected or a current streaming connection is released when the priority of the request for additional access is higher than that of a part of the current streaming connections. In this case, a user watching streaming content confronts abrupt suspension.

3. DISCLOSURE OF THE INVENTION

The present invention, by changing service quality of content adaptively, enables making the most of limited network resources, thereby accommodating connections at maximum capacity.

Also, the present invention, by changing service quality of content adaptively, enables the content to be provided with its best quality under limited network resources.

One method for changing service quality adaptively according to the present invention, when a service quality update request for a connection is received, invokes an action, which is used for requesting allowance of new access, on a device conducting traffic transfer services in order to change service quality of the connection. The invoked action has input arguments including traffic descriptor of the connection, the traffic descriptor containing information about service quality to change and the traffic descriptor stores an identifier in it for uniquely identifying the traffic descriptor.

Another method for changing service quality adaptively according to the present invention, when a request for allowance of access to a network is received and bandwidth consequent to the request for allowance of access cannot be provided, degrades service quality of a current servicing connection.

A further method for changing service quality adaptively according to the present invention checks whether available bandwidth exists on a network and when available bandwidth is found, upgrades service quality of a current servicing connection.

In one embodiment according to the present invention, when the device receives an action for requesting allowance of access, the action including in its input arguments traffic descriptor which contains an identifier registered to the device, the action is interpreted as a request for changing service quality of a currently established connection; when an action for requesting allowance of access is received and the action includes in its input arguments traffic descriptor which contains an identifier not registered to the device, the action is interpreted as a request for establishing a new connection satisfying service quality requested by the traffic descriptor.

In one embodiment according to the present invention, when an action for requesting establishment of a connection is received, allowance of access with service quality requested by traffic descriptor is requested on the device, the traffic descriptor being received by the action. At the time of the request, a unique identifier is assigned to the traffic descriptor. (At the same time, empty fields in the traffic descriptor are also filled.) When the request for access is admitted, a unique identifier within associated traffic descriptor information is returned to a control application which requested a connection establishment.

In one embodiment according to the present invention, a connection to change service quality is determined based on traffic policy.

In one embodiment according to the present invention, the traffic policy is priority information given to an entity which produced the corresponding connection or requester of access allowance.

In another embodiment according to the present invention, the traffic policy is priority information given to the corresponding connection or content to transfer which is the cause of a request for allowance of access.

In one embodiment according to the present invention, service quality is changed between HD (High Definition) and SD (Standard Definition).

In one embodiment according to the present invention, a connection to change service quality is determined by a management device managing allowance of access to a network.

In another embodiment according to the present invention, a connection to change service quality is determined by a control application for controlling multiple devices and/or services connected to a network.

4. BRIEF DESCRIPTION OF THE DRAWINGS

5. BEST MODE FOR CARRYING OUT THE INVENTION

Hereinafter, according to the present invention, preferred embodiments of a method for changing service quality of content adaptively will be described in detail with reference to appended drawings.

In one embodiment according to the present invention, at the time of a request for allowance of access to a network for content data transfer, information which describes traffic conducting the transfer (which is also called as traffic descriptor and from now on, is referred to as 'TD information' for short) is delivered to a manager which processes/manages requests for allowance of access. (Hereinafter, it is referred to as 'QoS (Quality of Service) manager'.) TD information includes type of the corresponding traffic (e.g., information indicating real-time data (streaming data) or non-realtime data), information indicating applicability of change of service quality, and also information specifying conditions depending on service quality (e.g., HD (High Definition) or SD (Standard Definition)) of the corresponding traffic (which is also called as 'Tspec information'). Tspec information includes information about service rate required for streaming of traffic of particular service quality.

The above terms such as TD, Tspec, etc are not main point to the present invention and therefore can be replaced with different terms.

In what follows, described are embodiments wherein service quality is changed adaptively according to the present invention.

Figure 1:
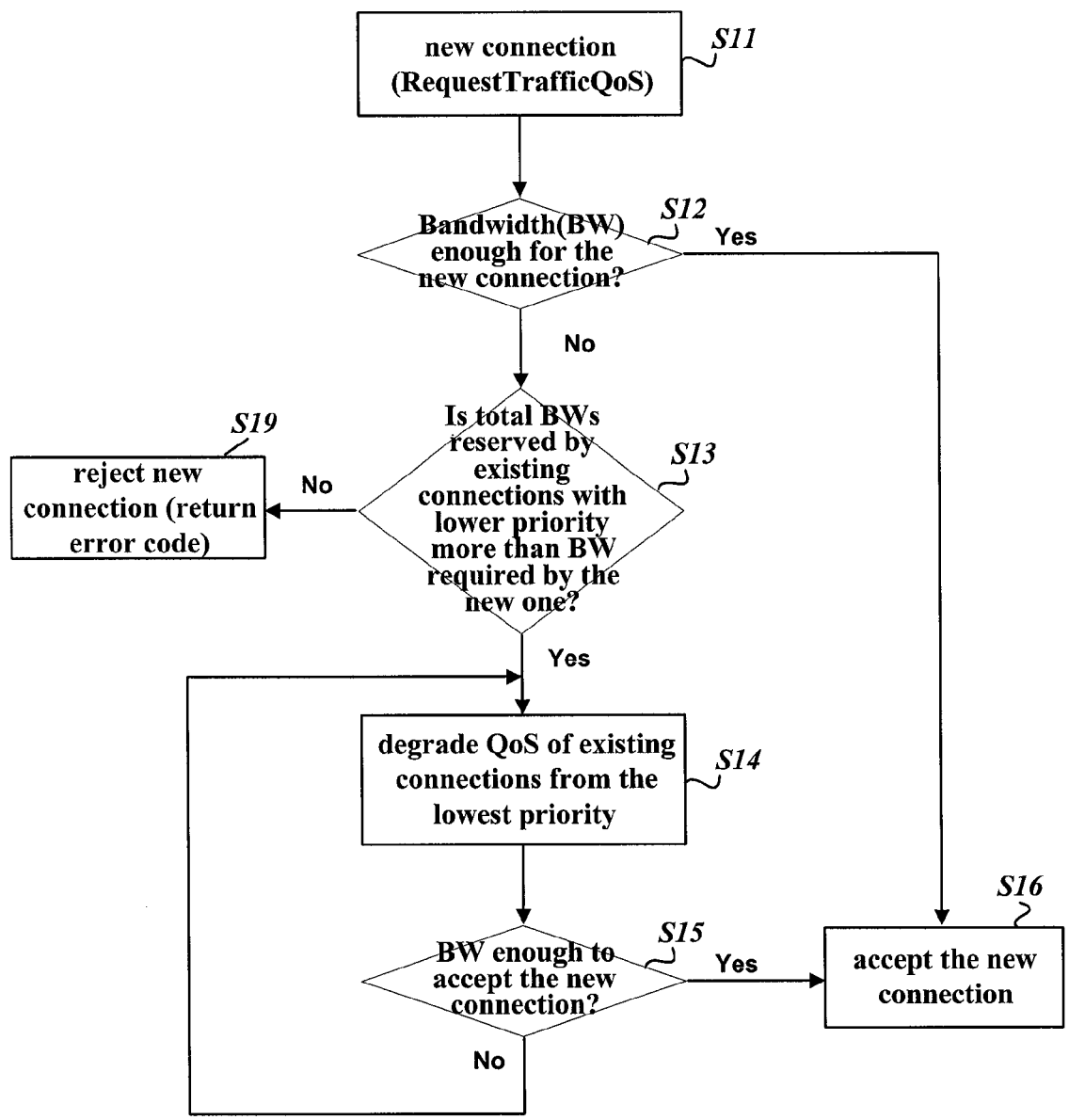
FIG. 1 illustrates a flow diagram wherein service quality of the content being serviced is degraded according to one embodiment of the present invention.

First, an embodiment of degrading service quality of current content being serviced is described. FIG. 1 is an example of a flow diagram describing the embodiment. As shown in the figure, when a request for a new connection (a request for allowance of access to a network) is made (S11), service rate of the quality specified in TD information accompanying the request (service rate specified in Tspec information which is set as active in TD information) is checked and whether the required bandwidth is available within current remaining bandwidth (unoccupied bandwidth after subtracting bandwidth reserved for streaming and so on from total available bandwidth provided by a network) is determined (S12).

If the required bandwidth can be accommodated, a request for a new connection is accepted (S16), otherwise service rate required by the new connection is compared with the sum of service rates of connections with lower priority than that of the newly requested connection (S13). If the latter is larger than the former, service quality of a current servicing connection(s) is changed (S14), otherwise the newly requested connection is rejected (S19).

As for a method for changing service quality of a current servicing connection(s), first it is checked whether it is possible to degrade the service rate of a connection of the lowest priority among current servicing connections which have lower priority than that of the newly requested connection. For example, it is determined to be possible when current service quality is HD (High Definition) and change of service quality is specified as applicable. If not as above, it is checked whether it is possible to degrade service quality of a connection of the next highest priority in the same way; a connection found to be degradable undergoes a process for degrading service quality, e.g., degrading to SD. (Specific operations between devices for degrading service quality is described later.) In another embodiment according to the present invention, when change of service quality is not applicable, e.g., the case of no alternative Tspec, the corresponding connection is released and the above operation can be applied to a connection of the next highest priority. By doing as described above, it is checked whether currently available bandwidth including newly secured one can still accommodate the newly requested connection (S15) and if it is found the newly requested connection cannot be accommodated, the same process is repeated against a connection of the next highest priority. When it is found the newly requested connection can be accommodated while carrying out the above process, the requested connection is accepted (S16).

When the newly requested connection cannot be established even though service quality of connections of lower priority than that of the newly requested connection has been degraded or because no connection is available for degradation, existing connections are released starting from the one of the lowest priority until the newly requested connection is established.

In another embodiment according to the present invention, as described above, an operation is carried out until the newly requested connection is established, where the operation releases a connection when change of the corresponding service quality is not applicable whereas the operation degrades service quality thereof otherwise, thus being repeated for a connection of the next highest priority.

Figure 2:
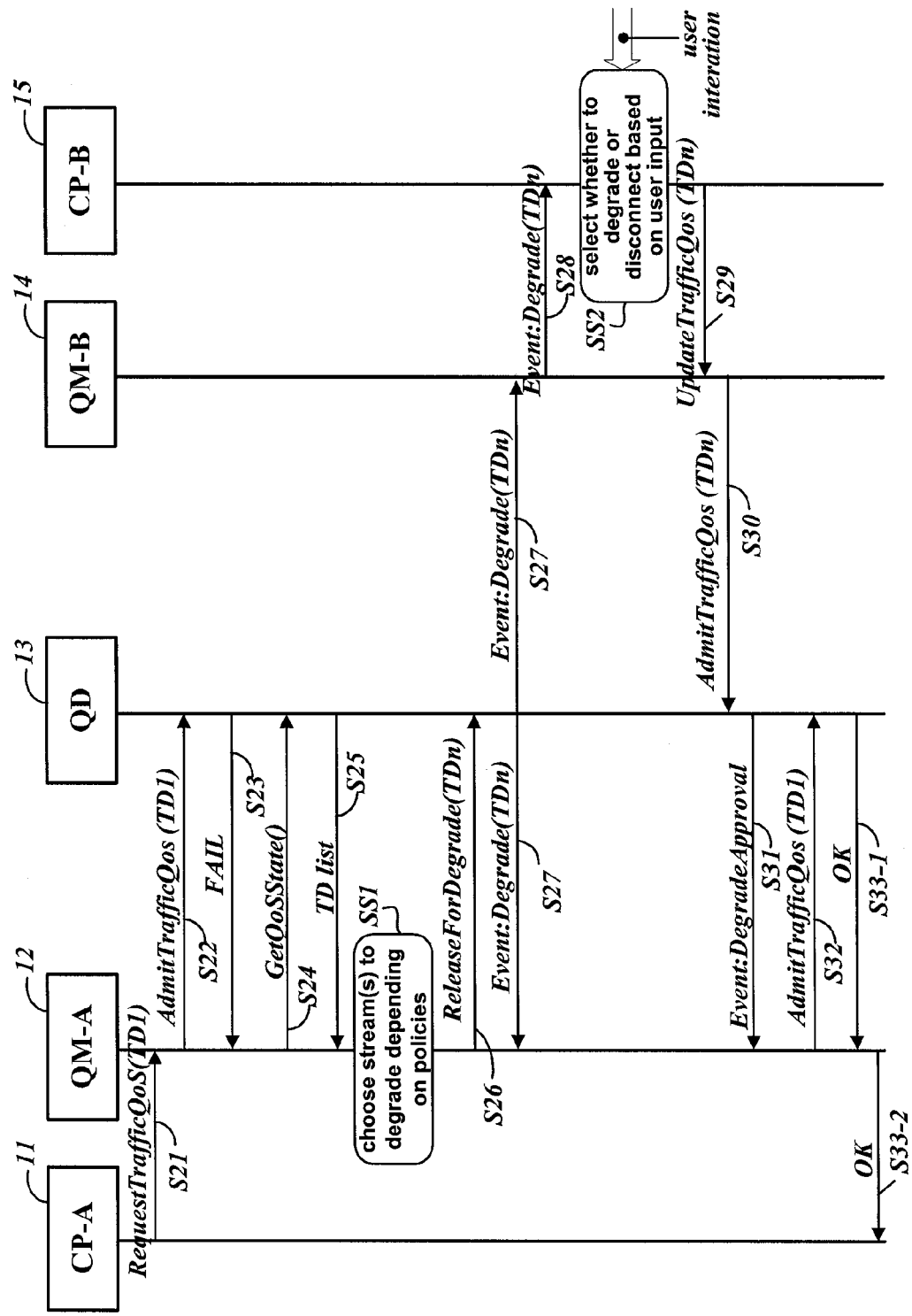
FIG. 2 illustrates a signal exchange procedure among devices, through which service quality of current content being serviced is degraded according to the embodiment of FIG. 1.

FIG. 2 illustrates a signal exchange procedure among devices, through which service quality of current content being serviced is degraded.

The procedure illustrated in FIG. 2 describes only a specific application of a signal exchange method between various devices for degrading service quality of content; principles and purpose of the present invention are not limited to the illustrated procedure in FIG. 2. Therefore, inventions employing different signal exchange methods but utilizing principles and purpose of the present invention should necessarily be considered to belong to the scope of the present invention.

Figures 3, 4:
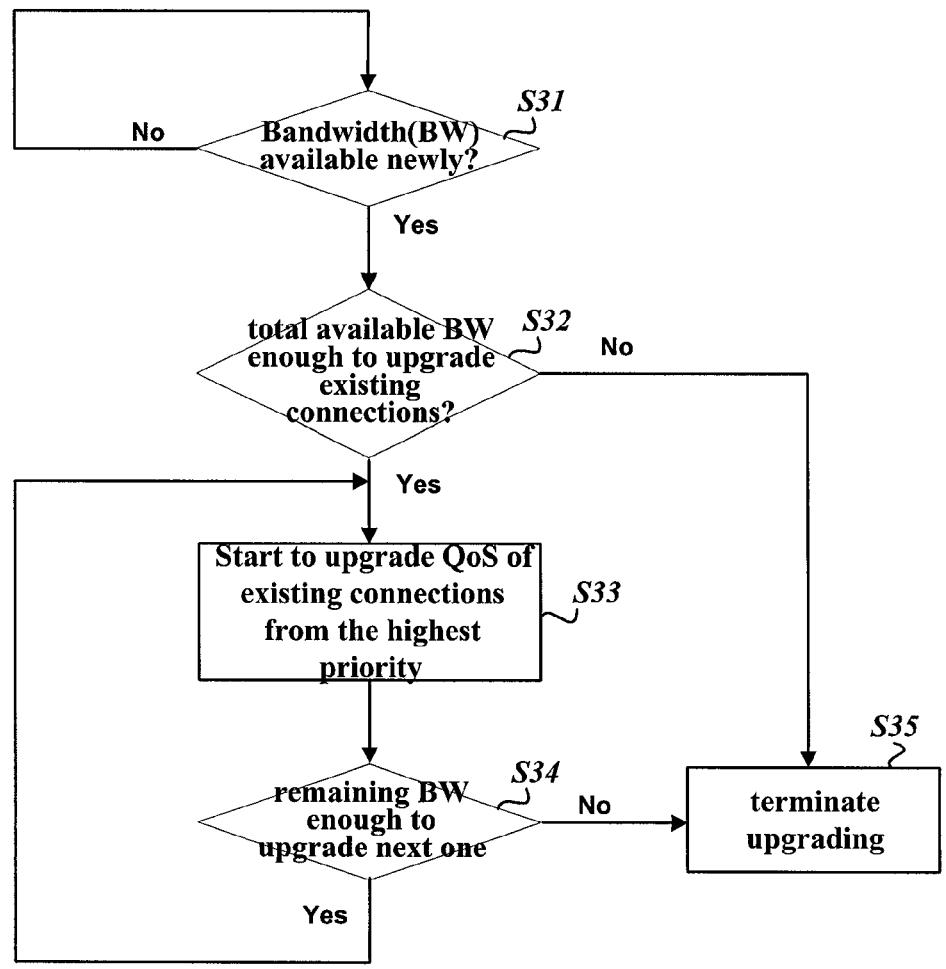
FIG. 3 illustrates the structure of an action used for requesting allowance of access to a network or updating traffic speed of a previously established connection.
FIG. 4 illustrates a flow diagram wherein service quality of the content being serviced is upgraded according to one embodiment of the present invention.

First, when a connection request for streaming content is made through a control point 11 from the user, the control point 11 configures TD information for the connection and invokes an action for requesting establishment of a connection (RequestTrafficQoS( )) to the corresponding QoS manager 12 (S21) (for the purpose of explanation, a control point and QoS manager associated with each other are distinguished by the letter A and B introduced in the figure); the QoS manager 12 then includes in an input argument TD information received according to the invocation, thereby invoking an action for requesting allowance of access (AdmitTrafficQoS( )) on a QoS device 13, (S22). FIG. 3 illustrates the structure of an action invoked at this moment. As shown in the figure, the action for requesting for allowance of access includes in its input argument TD information (Admit-TrafficDescriptor) and resource information (Resource) and response to the action is carried by result information (Admit-TrafficQoSResult). The resource information within the input argument contains information for specifying interface of a QoS device to transfer actual traffic after establishing a connection for traffic transfer.

Meanwhile, when an action for requesting allowance of access is received (S21), the QoS manager 12 creates a traffic handle consisting of string information (this information is used for uniquely identifying and managing TD information (namely, a connection for traffic transfer) between a control point 11 and QoS manager 12), requests allowance of access on a QoS device after recording the traffic handle within TD information received from the CP 11 (the corresponding fields within the TD information exchanged between devices and/or services are left blank or NULL before the recording), and when the QoS device sends a response of allowance of access, delivers the created traffic handle to the control point 11 in response to the connection request (S21). On the other hand, when a QoS device admits a request for allowance of access, it registers with itself a traffic handle included in traffic descriptor accompanying the request. Since the present embodiment is related to the case of changing service quality of another connection when a request for connection is rejected, further description about the case when a request for a connection is admitted is not provided.

A QoS device 13 which received a request for allowance of access from invocation of an action with the structure of FIG. 3 responds by reporting that a connection for access to a network cannot be admitted when service rate required by the TD information cannot be accommodated within currently available bandwidth (S23). The QoS device 13 represents a source and destination device to establish a connection, and also applies to the case of multiple devices when other devices exist on a data transmission path between the two devices; in what follows, the term of 'QoS device' should be understood as a device of the above meaning unless otherwise indicated.

When a request for allowance of access is rejected, the QoS manager 12 requests information about current servicing connections on the QoS device 13, (S24) and acquires TD information about all the current servicing connections from the QoS device 13 according to the request (S25). The QoS manager 12 then acquires each TD policy corresponding to each of acquired TD information and compares them with TD policy of a connection currently rejected for access. In an embodiment according to the present invention, the TD policy is priority of the user who requested the corresponding connection. In another embodiment according to the present invention, the TD policy is priority given to the content to transfer after establishing a connection. For example, the content of HD can have higher priority than that of the content of SD. Different information which is not mentioned in the description of the present invention can equally be utilized for the TD policy. During comparison of the TD policies, a connection is chosen as the one (n) to degrade service quality, the connection having the lowest TD policy among connections of lower TD policy than that of the previously rejected connection and servicing in high service quality, e.g., servicing in HD where the service quality is specified as changeable (connections having multiple Tspec information in TD information). Alternatively, a connection can be chosen as the one (n) to degrade service quality, the connection having multiple Tspec information in the corresponding TD information and servicing based on Tspec information specifying high service quality among connections of lower TD policy than that of the previously rejected connection. Although description about the present embodiment is limited to the case of choosing a single connection, it may be the cast that service quality of more than one connection should be degraded in order to allow the previous request for connection. In this case, since operations for a connection (n) described below can equally be applied to other connections determined to degrade their service quality, description for the case of degrading service quality of multiple connections will not be provided.

The QoS manager 12 invokes an action for degrading service quality of the chosen connection (n) to the QoS device 13 along with TD information of the connection (TDn) (S26). (The TD information has ActiveTspecIndex variable which specifies Tspec information indicating low service quality.) In response to the request (S26), the QoS device 13 creates an event for degrading service quality (Event:Degrade) (S27) and the event is delivered along with TD information (TDn) of a connection where degradation of service quality has been requested. The event is delivered to a QoS manager 12, 14 which has previously subscribed to the corresponding event. (In the embodiment of the present invention, all the QoS managers are assumed to have subscribed to the corresponding event.)

All the QoS managers 12, 14 which received the event transfer the event to all the control points which subscribed thereto for the event. A control point determines whether a connection in question where the event occurred corresponds to the servicing connection requested by itself for access; the event is ignored when the connection is not the one that the control point requested for access. In the embodiment of FIG. 2, a control point 15 in group B is assumed to be the requester for the connection (n); therefore, a control point 11 in group A ignores the event. As an event for degrading service quality is relayed from a QoS manager 14 in group B (S28), the control point 15 determines a scheme for processing the corresponding connection through interaction with the user (SS2). For example, whether service quality is to be degraded or streaming service is to be suspended for a connection requested for degrading service quality is notified by appropriate UI (User Interface) and a choice between the two is received. When the user's choice is degradation of service quality, the control point 15 invokes an action for updating traffic QoS to the corresponding QoS manager 14 according to the Tspec information specified as active in TD information of a connection received by the event (Event:Degrade) (S29). If the user requests suspension of service, the control point 15, instead of an action for updating the traffic QoS (UpdateTrafficQoS), requests an action for releasing the corresponding connection (n) on the QoS manager 14.

In another embodiment according to the present invention, degradation of service quality can be carried out without interaction with the user. For example, when degrading service quality is specified as 'automatic' in the TD information of a connection requested for degrading service quality, the control point 15 can immediately carry out the request operation (S29) without interaction with the user.

In a further embodiment according to the present invention, when the operation of degrading service quality is carried out without interaction with the user or the corresponding connection is released, a notice explaining the cause for degrading service quality or releasing the corresponding connection is provided to the user of the corresponding connection (namely, the control point which created the connection).

The QoS manager 14 which received an action for updating traffic QoS (UpdateTrafficQoS), according to the request, invokes an action of FIG. 3 to the QoS device 13, which is identical to the action used for requesting allowance of access for a new connection (S30). Meanwhile, since the TD information (TDn) accompanying the action for requesting allowance of access has an associated connection already established, at the time the QoS device 13 admits an initial request for allowance of the connection, a traffic handle created by the QoS manager 12 is already inserted in the TD information (TDn).

Therefore, the QoS device 13, when a traffic handle within TD information accompanying a received request for allowance of access is not registered to itself, determines that service rate requested by the Tspec should be newly provided; when the traffic handle is registered to itself, the QoS device 13 determines that changing service quality with service rate requested by the Tspec has been requested. Since the description about the present embodiment is related to degrading service rate of a servicing connection, a traffic handle in received TD information (TDn) is already registered to a QoS device. Therefore, the QoS device 13 services by lowering service rate with reduction of bandwidth of current traffic and when service rate gets lowered down to the rate required by Tspec, creates an event (Event:DegradeApproval) notifying that degrading service quality of other connections has been completed due to the service rate required by TD information (TD1) of a connection which previously requested allowance of access (S31). In another embodiment of the present invention, instead of an event reporting completion of degrading service quality, a response to the previous action for degrading service quality (ReleaseForDegrade) can notify that degrading service quality has been successfully completed. On the other hand, by the QoS manager's 12 subscribing at appropriate time, e.g., at the moment of requesting an action for degrading service quality (S26), only the manager which has requested degrading service quality (only the QoS manager 12 of group A in the example of FIG. 2) can receive the event (Event:DegradeApproval).

The QoS manager 12 which received the event of completion of degrading service quality requests again allowance of access on the QoS device 13 by using TD information (TD1) of a connection whose previous request for allowance of access has been rejected (S32). The QoS device 13, when service rate required by Tspec of TD information (TD1) accompanying a received request for access can be provided, registers a traffic handle within the TD information (TD1) with itself and provides a response admitting the access (S33-1). The QoS manager 12 which receives an admittance response relays traffic descriptor information to the corresponding control point 11 in response to the action for requesting establishment of a connection "RequestTrafficQoS" (S33-2), where a traffic handle assigned by the traffic descriptor information itself is contained in the associated TD information.

If an event of completion of degrading service quality is not received within prescribed time after requesting the action for degrading service quality or a response notifying of completion of degrading service quality is not received, the QoS manager 12, gives the control point 11 a response notifying that the request originating from the previous action for requesting allowance of access (RequestTrafficQoS) has been rejected.

As described above, since additional bandwidth is secured by adjusting service quality of current connections to lower quality, service for other connections can be provided through the QoS device 13.

FIG. 4 illustrates a flow diagram of an embodiment for upgrading service quality of the content being serviced according to the present invention. As shown in the figure, when additional bandwidth is available (S31), it is determined whether service quality of servicing connections can be upgraded within total available bandwidth including the additional bandwidth (S32).

If service quality of at least one connection cannot be upgraded, the process of upgrading service quality is terminated (S35), otherwise the service quality is adjusted starting from the connection of the highest priority (S33). If TD information about a connection with a priority deserving upgrading service quality is specified as changeable and streaming of the connection is provided in low quality, e.g., SD, the service quality is upgraded to HD. (Specific operations between devices for upgrading service quality is described later.) If the above condition is not met, the same procedure is carried out on a connection of the next highest priority. When available bandwidth is reduced due to upgrading service quality of one connection, it is determined whether service quality of a connection of the next highest priority can be upgraded within the reduced bandwidth (S34). If further upgrade of service quality for other connections is not affordable within the reduced bandwidth, the process of upgrading service quality is terminated (S35).

Figure 5A:
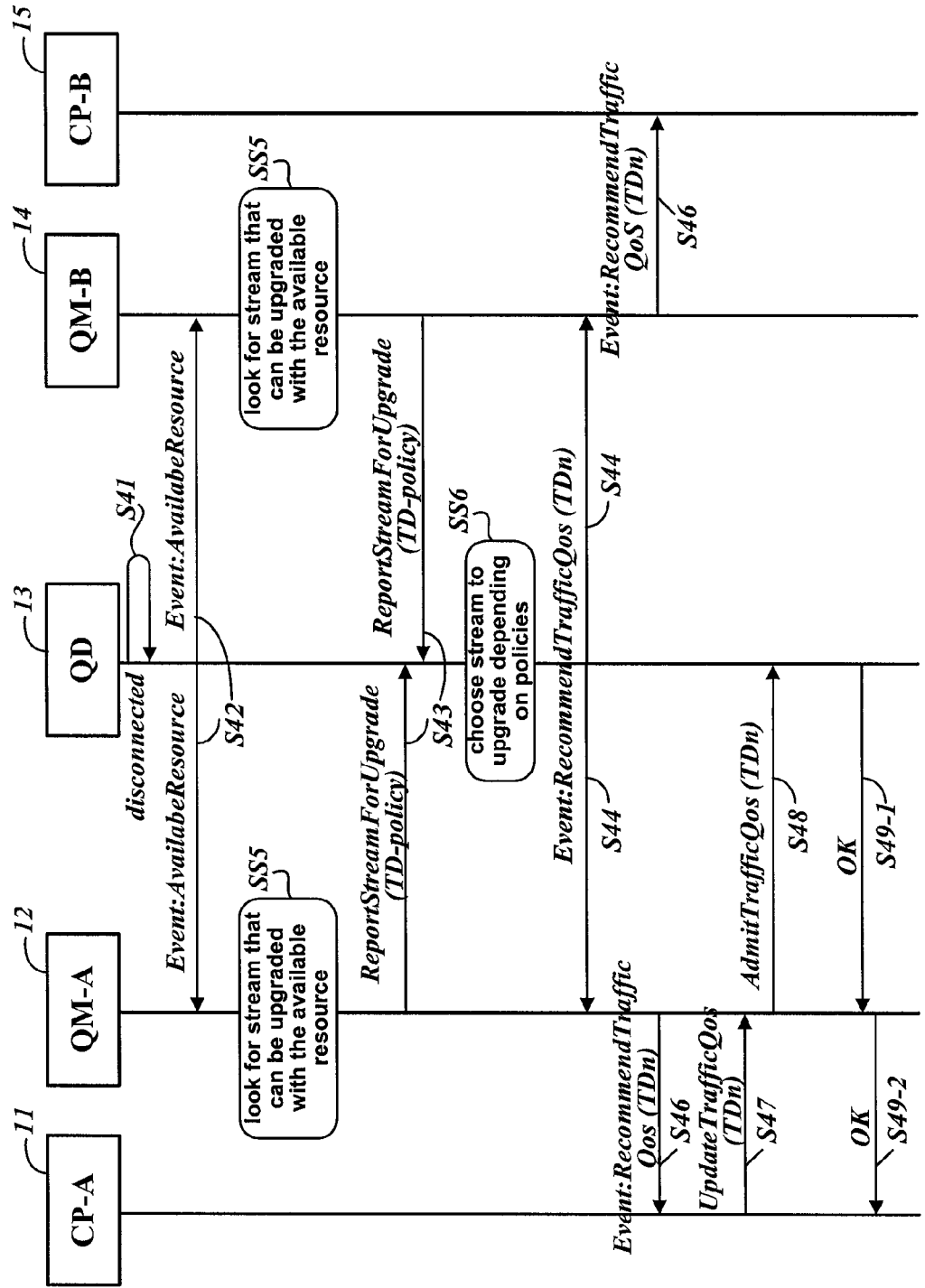
FIGS. 5A and 5B respectively illustrate signal exchange procedures, through which service quality of current content being serviced is upgraded according to the embodiment of FIG. 4.

FIG. 5A illustrates a procedure for upgrading service quality of current content being serviced according to one embodiment of the present invention.

The procedure illustrated in FIG. 5A describes only a specific application of a signal exchange method between various devices for upgrading service quality of content; principles and purpose of the present invention are not limited to the illustrated procedure in FIG. 5A (and FIG. 5B described later). Therefore, inventions employing different signal exchange methods but utilizing principles and purpose of the present invention should necessarily be considered to belong to the scope of the present invention.

First, a QoS device 13, when a servicing connection is released (S41), creates an event notifying that additional bandwidth is available due to the release (S42). The created event is delivered to a device which already subscribed to the event; for the purpose of description of an embodiment of the present invention, each of QoS managers 12, 14 is assumed to have subscribed to the event. Therefore, an event of creation of additional bandwidth generated from the QoS device 13 is delivered to each of QoS managers 12, 14, (S42). In another embodiment of the present invention, each QoS manager 12, 14, by periodically inquiring of the QoS device 13 about the state of current remaining bandwidth and receiving the result, can notice that additional bandwidth has been generated within network resources.

Each of the QoS managers 12, 14 specifies one or multiple connections for upgrading service quality, based on TD policy and TD information of individual connections under the management of respective QoS managers for service quality. Each of the QoS managers 12, 14, based on TD policy, determines (SS5) one or more than one connection for updating service quality from among connections which are specified as applicable for change of service quality in the TD information of the above connections under the management of respective QoS managers 12, 14 for service quality, being serviced in low service quality, and can be accommodated for upgrading service quality within total available bandwidth. TD policy or policy list of the determined connection or connections is delivered to the QoS device 13 (S43).

In another embodiment of the present invention, each of the QoS managers 12, 14, after approval of a request for allowance of access, may cease managing the corresponding connection. In the present embodiment, each of the QoS managers 12, 14, after receiving an event of generation of additional bandwidth, receives information about all the current servicing connections by requesting an action on the QoS device 13 and determines a connection or connections for upgrading service quality as described in the above embodiment.

The QoS device 13, after receiving from each of QoS managers 12, 14 TD policy about connections determined for upgrading service quality, determines one or more than one connection based on TD policy of each connection for which upgrading service quality is possible within total currently available bandwidth considering actual service rates of servicing streams (SS6). FIG. 5A illustrates an example where a connection (n) requested for access from a control point 11 of group A is determined for upgrading service quality. Therefore, when the QoS device 13, in response to an action "ReportStreamForUpgrade" from each of QoS managers 12, 14, creates an event carrying TD information (TDn) (this TD information contains information specifying Tspec information about upgraded service quality as active) of a connection (n) determined for upgrading service quality (S44) and relays the event to the corresponding control points 11, 15 through each of the QoS managers 12, 14 (S46), the control point 15 of group B ignores the event. Description of the present invention is related to the case of upgrading service quality for a single connection; necessarily, service quality of multiple connections can also be upgraded. Since the case of multiple connections can be accomplished by carrying out operations described below for each connection, detailed description thereupon will be omitted.

The event relayed by the QoS manager 12 of group A is delivered to a control point 11 of the same group previously subscribed to the corresponding event. Then the control point 11 requests an action for updating traffic QoS (UpdateTrafficQoS) on the QoS manager 12 (S47) according to Tspec information specified as active in the TD information (TDn) of a connection received by the event, the Tspec information indicating high service quality, e.g., HD; the QoS manager 12 invokes an action as shown in FIG. 3 to the QoS device 13 according to the request, which is identical to the action used for requesting allowance of access for a new connection and requests change of service quality of existing connections (S48). Meanwhile, The TD information (TDn) accompanying the action for requesting allowance of access now contains a traffic handle registered at the time the QoS device 13 admits an initial request for allowance of a connection associated with the action.

Therefore, the QoS device 13 decides to change service quality to acquire service rate required (specified as active) by Tspec of TD information accompanying a received request for allowance of access and if it is possible to provide service rate required by the Tspec, increases service rate by allocating additional bandwidth to current transferring traffic along with delivering a response admitting the access (S49-1). The delivered response is relayed to the control point 11 as a response to the QoS update action "UpdateTrafficQoS" (S49-2).

As described above, by adjusting service rate relevant to improved service quality, streaming of content with improved quality is made possible through the QoS device 13.

In another embodiment according to the present invention, a User's choice can be introduced in determining a connection for upgrading service quality. FIG. 5B illustrates a signal exchange procedure between devices according to an embodiment for incorporating user's choice.

Figure 5B:
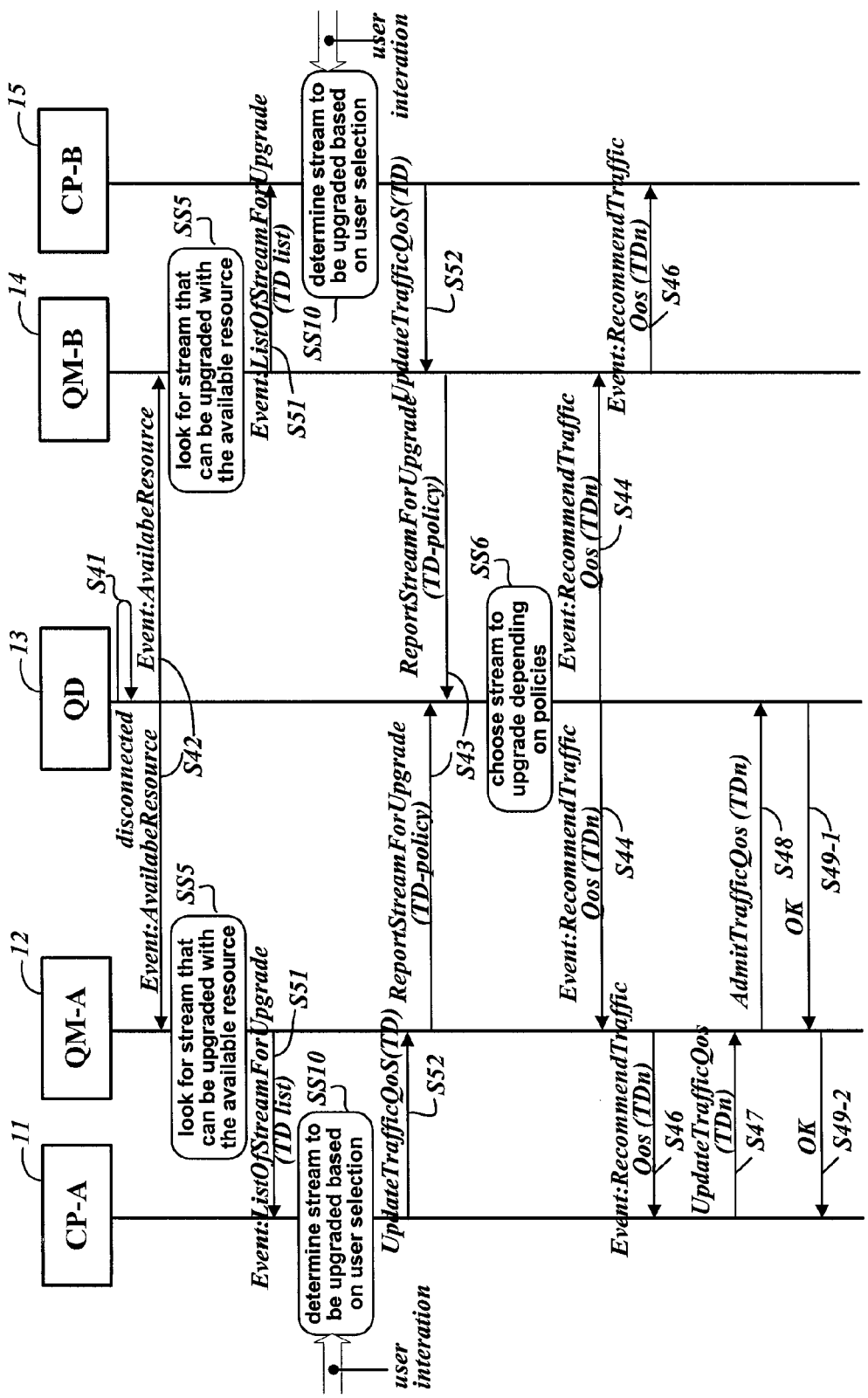

As shown in FIG. 5B, when each of QoS managers 12, 14 receives an event of occurrence of additional bandwidth (S42), a new event in response to the event is created and delivered to each control point 11, 15. At this time, each of QoS managers 12, 14, among connections under its own management for service quality, searches for connections to upgrade service quality within total available bandwidth (SS5) and incorporates into the event a list of TD information about connections found from the search, thereby delivering the event to a control point (S51). In another embodiment of the present invention, transfer information about all the connections can be received by requesting the above transfer information on the QoS device 13 and subsequently delivered to a control point along with the event. In a further embodiment according to the present invention, when each control point 11, 15 receives an event (S51), each control point 11, 15 requests TD information about connections on the QoS managers 12, 14; then each QoS manager 12, 14 can provide the corresponding control point 11, 15 with information managed by itself or information received from the QoS device 13.

Each control point 11, 15 provides the user with connections having TD information indicating upgrading service quality through a relevant user interfacing method and lets the user choose one or more than one connection from the provided connection information (SS10). When one or more than one connection is chosen, each control point 11, 15 invokes an action for upgrading service quality of chosen connections on each of QoS managers 12, 14 (S52). Each of QoS managers 12, 14 checks TD policy of requested connections and delivers checked TD policy or a list of TD policies to the QoS device 13, (S43). The subsequent procedure for choosing and upgrading service quality of one or more than one connection is the same as the embodiment described with reference to FIG. 5A.

In the above embodiments, since change of service quality is carried out by a single action instead of multiple stages comprising release of the corresponding connection and re-assignment of service rate, problems due to connection racing do not occur. When it is needed to reconfigure a connection to change service rate after release of a connection, it may be the case that connection setup for degrading or upgrading service rate cannot be accomplished due to conflict with a request for another new connection after release of the connection; such problem dose not happen in the above embodiment.

Also, since an action invoked on a QoS device for changing service quality utilizes the same action as the one used for newly establishing a connection, such tasks as defining additional action, re-design for interpretation thereof in a device or service, etc are not required.

At least one embodiment of the present invention described through a limited number of embodiments above enables other data service by changing content quality of data service through a network (e.g., streaming service) in an appropriate way and also enables to make the most of given network resources by improving content quality when additional bandwidth becomes available.

The foregoing description of a preferred embodiment of the present invention has been presented for purposes of illustration. Thus, those skilled in the art may utilize the invention and various embodiments with improvements, modifications, substitutions, or additions within the spirit and scope of the invention as defined by the following appended claims.

The invention claimed is:

1. A method for establishing a new traffic stream when a resource required for the new traffic stream is insufficient, the method performed by a manager and comprising:

performing a setting operation for setting a first traffic stream in a device used for transmitting data, wherein the manager manages a traffic stream of the device and the setting operation comprises:

receiving, from a controller that controls the manager, a first connection request for requesting the first traffic stream, the first connection request comprising a description field for describing the first traffic stream;

generating a traffic stream identifier for identifying a traffic stream among a plurality of traffic streams transmitted by the device;

inserting the generated traffic stream identifier into the description field of the first connection request;

transmitting, to the device, a first traffic stream request comprising the description field with the traffic stream identifier inserted in order to set the first traffic stream in the device;

registering the generated traffic stream identifier in the device when the first traffic stream is successfully set;

receiving a second connection request from the controller for requesting the second traffic stream;

transmitting, to the device, a second traffic stream request in order to set a second traffic stream in the device when the second connection request is received;

receiving, from the device, a fail response indicating that the device has determined that an available resource is insufficient for both the traffic stream and the second traffic stream;

obtaining first priority information of the first traffic stream and second priority information of the second traffic stream after receiving the fail response;

comparing the first priority information to the second priority information;

transmitting a releasing request to the device if the first priority information indicates that the first traffic stream has a lower priority than a priority of the second traffic stream, the releasing request including the traffic stream identifier to identify the first traffic stream;

releasing, by the device, the first traffic stream identified by the traffic stream identifier included in the releasing request in order to recover a resource used for the first traffic stream;

setting the second traffic stream in the device when a resource required for the second traffic stream is recovered by releasing the first traffic stream;

registering a traffic stream identifier in the device for identifying the second traffic stream when the second traffic stream is set in the device; and wherein each of the first and second priority information comprises at least a traffic importance number and a user importance number.

2. A managing device for establishing a new traffic stream, the managing device comprising:

an physical interface unit configured to transmit and receive data; and a processor configured to perform a setting operation for setting a first traffic stream in a device used for transmitting data, wherein the setting operation comprises:

receiving, from a controller, a first connection request for requesting the first traffic stream, the first connection request comprising a description field for describing the first traffic stream;

generating a traffic stream identifier for identifying a traffic stream among a plurality of traffic streams transmitted by the device;

inserting the generated traffic stream identifier into the description field of the first connection request;

transmitting, to the device via the physical interface unit, a first traffic stream request comprising the description field with the traffic stream identifier inserted in order to set the first traffic stream in the device;

registering the generated traffic stream identifier in the device when the first traffic stream is successfully set;

receiving a second connection request from the controller for requesting the second traffic stream;

transmitting, to the device via the physical interface unit, a second traffic stream request in order to set a second traffic stream in the device when the second connection request is received;

receiving, from the device via the physical interface unit, a fail response indicating that the device has determined that an available resource is insufficient for both the traffic stream and the second traffic stream;

obtaining first priority information of the first traffic stream and second priority information of the second traffic stream after receiving the fail response;

comparing the first priority information to the second priority information;

transmitting a releasing request to the device via the physical interface unit if the first priority information indicates that the first traffic stream has a lower priority than a priority of the second traffic stream, the releasing request including the traffic stream identifier to identify the first traffic stream;

releasing, by the device, the first traffic stream identified by the traffic stream identifier included in the releasing request in order to recover a resource used for the first traffic stream;

registering a traffic stream identifier in the device for identifying the second traffic stream when the second traffic stream is set in the device;

setting the second traffic stream in the device when a resource required for the second traffic stream is recovered by releasing the first traffic stream; and wherein each of the first and second priority information comprises at least a traffic importance number and a user importance number.

\* \* \* \* \*